United States Patent
Asaeda et al.

(10) Patent No.: US 6,741,573 B1
(45) Date of Patent: May 25, 2004

(54) METHOD AND APPARATUS FOR DYNAMICALLY ASSIGNING A SATELLITE LINK

(75) Inventors: Hitoshi Asaeda, Sagamihara (JP); Hidetaka Izumiyama, Yokohama (JP); Jun Takei, Hino (JP); Shinya Kotani, Koganei (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,965

(22) Filed: May 25, 2000

(30) Foreign Application Priority Data

May 27, 1999 (JP) .......................................... 11-148218

(51) Int. Cl.$^7$ ............................................. H04B 7/185
(52) U.S. Cl. ................... 370/316; 370/395.52; 370/475
(58) Field of Search ................................. 370/316, 319, 370/321, 323, 326, 328, 329, 345, 346, 349, 395.5, 395.52, 401, 475

(56) References Cited

U.S. PATENT DOCUMENTS

| | | | |
|---|---|---|---|
| 5,995,726 A | * | 11/1999 | Dillon ........................ 709/231 |
| 6,188,684 B1 | * | 2/2001 | Setoyama et al. .......... 370/352 |
| 6,236,652 B1 | * | 5/2001 | Preston et al. ............. 370/349 |
| 6,295,283 B1 | * | 9/2001 | Falk ............................ 370/325 |
| 6,411,606 B1 | * | 6/2002 | Moura et al. .............. 370/282 |
| 6,473,097 B1 | * | 10/2002 | Elliott ........................ 345/733 |
| 6,519,243 B1 | * | 2/2003 | Nonaka et al. ............ 370/338 |
| 6,560,221 B1 | * | 5/2003 | Hara et al. ................. 370/352 |

FOREIGN PATENT DOCUMENTS

JP  09252271 A  9/1997

* cited by examiner

*Primary Examiner*—Kwang Bin Yao
(74) *Attorney, Agent, or Firm*—Francis A. Sirr, Esq.; Holland & Hart LLP

(57) ABSTRACT

A satellite link is dynamically assigned in a communication system having a plurality of clients, each client having a unidirectional satellite receiving means and a bi-directional network communication means. Unique information of each client is stored at the managing server within a service provider. A client utilizes its network communication means to send a request to the managing server. The managing server then allocates an IP address to the client's satellite receiving means, and a satellite link is established between the client's satellite receiving means and the managing server based upon the stored unique information of the given client. The assigned IP address corresponds to the assigned satellite link, and the assigned IP address is sent from the managing server to the client utilizing the client's directional network communication means.

25 Claims, 4 Drawing Sheets

[Figure 1]
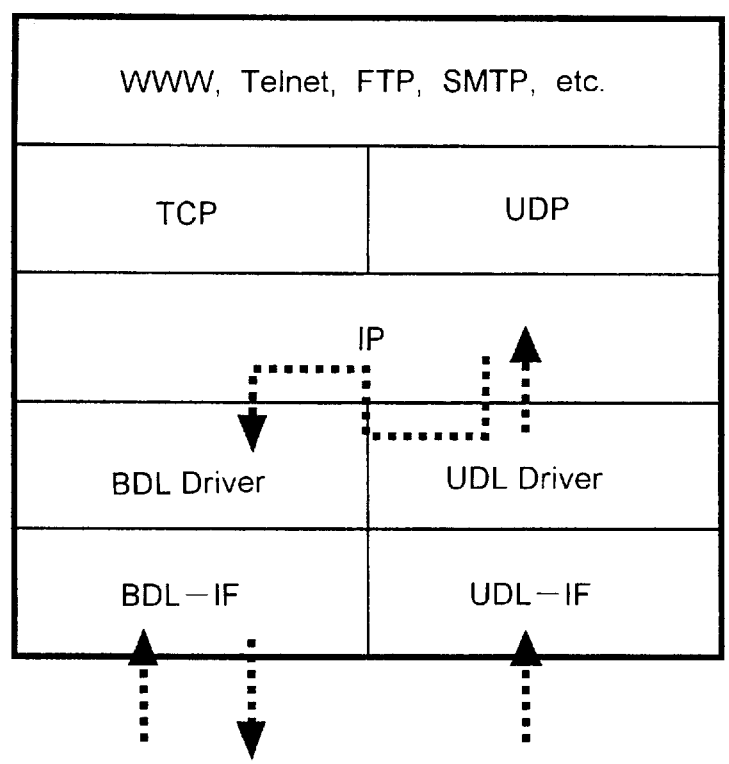

[Figure 2]
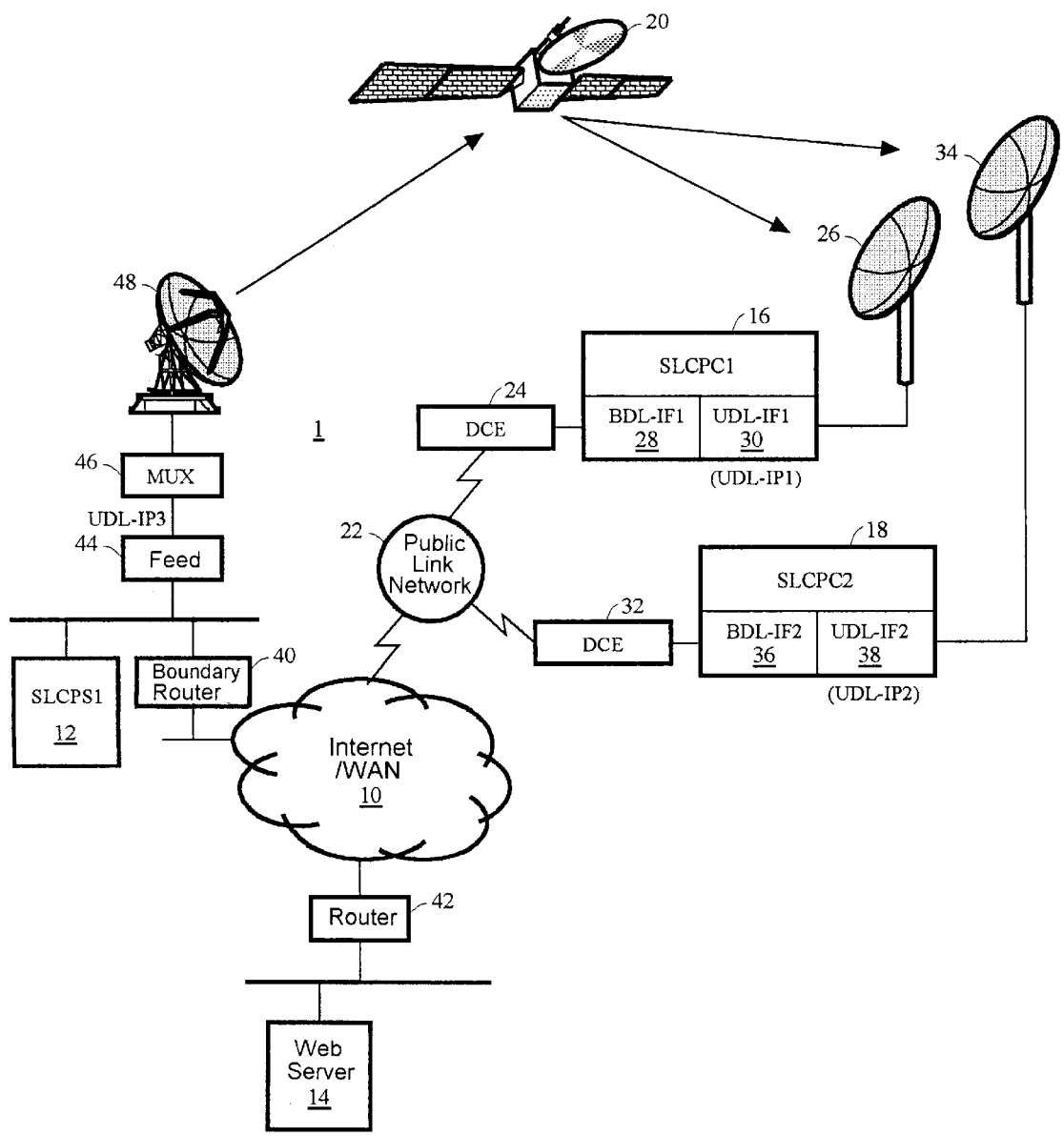

[Figure 3]
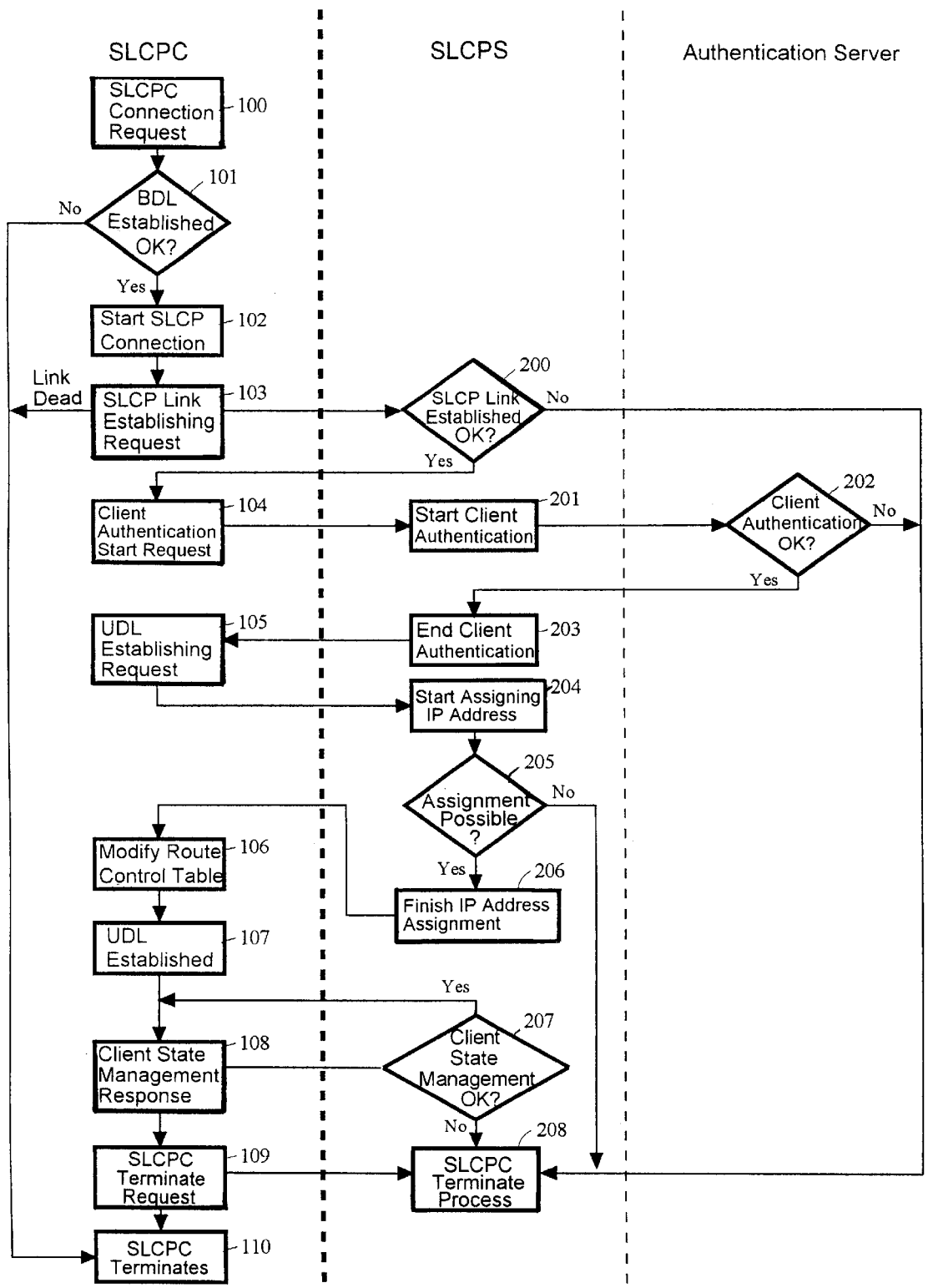

[Figure 4]
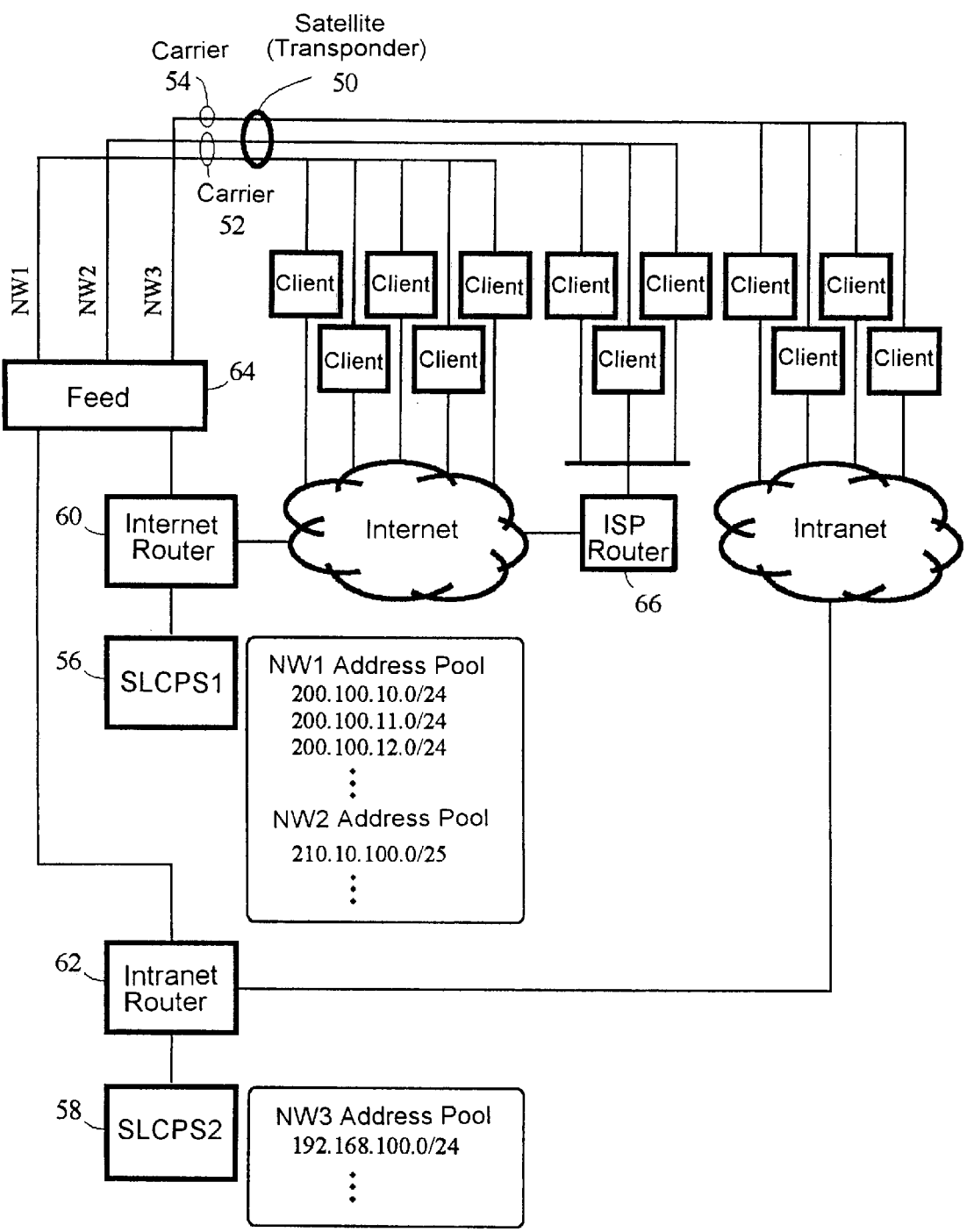

METHOD AND APPARATUS FOR DYNAMICALLY ASSIGNING A SATELLITE LINK

BACKGROUND OF THE INVENTION

1. Field of the Invention

This invention generally relates to communication systems utilizing a satellite link and, in particular, to a method and apparatus for dynamically assigning a satellite link to a client in response to a request from the client.

2. Description of the Related Art

Because of the limited bandwidth of a network of the Internet, especially a limited bandwidth of a line to a home of an Internet user who uses a dial up, users complaints have increased due to unavailability of satisfactory service while the demand of the Internet has consistently increased. A problem for a user who has a dedicated line is inability of assuring enough bandwidth because the user may want to suppress line cost investments to a minimum.

Further, a contents provider tends to demand transmission of a larger data size than conventional information, such as an image and a voice, to make the contents fancier or to provide a new service. This causes the network bandwidth needed by users to expand more and more.

In such circumstance, a satellite network providing an advantage of a wider bandwidth and service area has been focused as a new infra-structure of network. However, a user usually prepares a receive-only device for satellite wave with no transmission function (satellite receiving antenna, antenna adapter or board, set-top-box, etc.) as a user side facility. This means the end-user having only the above receive-only device cannot use a satellite network as a part of the Internet because a bi-directional link which provides on-demand communication is its prerequisite. Therefore, some mechanism has to be implemented into a client machine to make the satellite link appear as if it is bi-directional.

When an end-user's terminal which does not have a transmitting set communicates with a satellite, the following four schemes a–d may be conventionally available.

a. In this scheme, a client machine simply receives data flowing down from a satellite. This is analogous to the morphology of a television broadcasting and has no on-demand capability which is the basic requirement of the Internet. However, the configuration is simplest. This may be referred to as a "unidirectional communication receiver".

b. In this scheme, a client machine dials up a predetermined site using an inexpensive modem and a telephone line to request transmission of only the data residing in the site server. This is relatively easy to configure and useful, for example, when it is desired to use a satellite network as a part of an intranet. However, this can not be used in a wide area network such as the Internet. This may be referred to as a "site local receiver".

c. In this scheme, a client machine dials up a predefined site in a manner similar to the above scheme b and requests a mediate agent server (proxy server) in that site to distribute data. The agent server receives data from a target server which may be located in other than the dialed up site and distributes it via a satellite. This makes the receiver pretend to do a bi-directional satellite communication in effect though the receiver communicates with the target server indirectly. This morphology can be used not only in a closed environment such as an intranet but also for an Internet service. However, available services are limited because the request from a client depends on service items which the agent server can process. In addition, as well as a site local receiver, the client must connect to a predefined dial-up site first. Also, a client's request packet must go through the dial-up site regardless of the target server location. This configuration may bring an unwilling state to the customer due to unneeded roundabout. This may be referred to as an "indirect receiver".

d. This scheme emulates a perfect bi-directional communication in which a client transmits a request directly to a target server by using its surface line as a pseudo-transmitting (uploading) channel toward a satellite, while a modem, a terminal adapter (TA) and a telephone line are also required in the manner similar to the above schemes b and c. This may be referred to as a "bi-directional communication emulation receiver". This is also used in this invention and will be described later in detail.

It is necessary to adopt the above scheme d in order to utilize a satellite link as a part of a general high bandwidth network which can be inter-operated with the Internet by making the link pretend to be a bi-directional link, i.e., to utilize a satellite communication as a perfect IP (Internet Protocol) network infra structure.

1. Prerequisite of Client:

A user prepares a client machine having a modem or TA connected with a telephone line to provide a bi-directional link interface (hereinafter called BDL-IF) for a terrestrial link and a receive-only a satellite receiver board, or a satellite receiver having a BDL-IF and an antenna connection interface (hereinafter collectively called "client machine"). To set up the client machine, not only an IP address of BDL-IF but an IP address of a unidirectional interface (hereinafter called UDL-IF), which is different from the one for BDL-IF, must be assigned. This UDL IP address is assigned from a satellite communication provider (hereinafter simply referred to as a service provider which is different from a so-called Internet service provider or ISP) such as a satellite communication enterprise or a satellite communication system integrator.

With regard to a routing table for the client machine, UDL-IF must be set to be a default interface for sending an IP packet. By doing this, a normal outgoing IP packet is hooked to be transmitted to the UDL-IF. This is for the purpose of making the TCP/IP layer above the UDL-IF driver pretend to send out its own request packet from the UDL-IF. At this time, because the receive-only UDL-IF can not send out the IP packet, the user selects a BDL-IF for sending out the IP packet instead of the UDL-IF statically or dynamically with some action. While a request packet is sent out from a selected terrestrial line to a target server, the sender address shown therein is the address of the UDL-IF.

To pretend the above mechanism is sending out a packet from UDL-IF, it is a software prerequisite for the client machine to include a function of delivering (hooking) an output IP packet to the data link layer of a preselected BDL-IF at the moment when the IP packet is delivered from the IP layer to the data link layer of the UDL-IF upon sending out the packet from that interface as shown in FIG. 1. This mechanism is implemented in a place between the IP layer and the UDL-IF driver as a part of the function of the data link layer of the UDL-IF.

What has to be satisfied as a network prerequisite is only to assure that the client machine keeps an IP reachability to the target server through a terrestrial line, and it is not necessary to dial up to a predetermined site in the manner in which a unidirectional communication receiver or a site local receiver does.

The system described above need not modify a TCP/IP application which the user uses daily and the hardware/driver of the interface for a terrestrial line equipped in the client. Therefore, it is a substantial merit that modification of a client is minimized.

2. Data Flow:

The client machine sends out a packet which indicates the address of the UDL-IF as a sender to any target server via the BDL-IF. An addressed target server or destination server receives the IP packet and finds the route by itself or from the parent router that the sender IP address is a part of the address range managed by a service provider.

The addressed target server then transfers a reply packet toward a boundary router propagated by the service provider because the route to the sender indicates the site of the service provider, and sends it either to a router to which a satellite wave transmitting device called a "feed" is connected (hereinafter referred to "feed router") or directly to the feed if the feed is a router itself. The feed router or the feed transmits this reply packet toward a transponder (satellite) via a satellite signal divider (multiplexor) and the packet is finally delivered to the UDL-IF of the requesting client machine. As such, it is possible to make the satellite link pretend to be a bi-directional link.

Japanese Published Unexamined Patent Application 9-252271 discloses a technique of IP packet communication utilizing a satellite as described in the above. In this technique, when an IP packet indicating a service request is transmitted from a client PC to a server via the ISDN, the IP address of the sender is rewritten from the address of an ISDN card (BDL-IF) to the address of an STTH card (UDL-IF). The server then sends out an IP packet conforming to the request to the STTH card of the client PC via an antenna and a communication satellite with the address of the STTH card as the destined address.

SUMMARY OF THE INVENTION

This invention provides a method and apparatus for dynamically assigning a satellite link for efficiently managing the satellite link. One of the problems solved by this invention is that, in configuring the mechanism for making the satellite link pretend to be a bi-directional network as described above, the service provider has to prepare and notify the respective users of IP addresses dedicated to all client machines and each user has to statically set the address individually. This not only leads to a waste of IP addresses but also possibly causes trouble due to an erroneous setting by the user. In addition, it is difficult to protect the IP address from being used erroneously or without authority by a user.

Further, beside registration of a new user, the service provider has to assure that the IP address be returned when a user cancels a contract of a satellite communication service and reassign the address to another user to properly reuse the addresses. In other words, the service provider has to keep a consistent careful management of each IP address and user information. This means, when the number of users increases, it is not only necessary to reserve a tremendous number of addresses but also considerable labor to manage them is required, so it may not be realistic to keep a careful operation.

This is nothing but assuring a bandwidth of usable satellite link continuously and may cause a problem of inability of efficiently utilizing satellite channel resources or quickly conforming to the increase of receiving sites (the number of client machines). In other words, because it is difficult to precisely grasp the usage of the satellite link or suitably estimate a future usage of the satellite link, this may possibly lead to a problem of the resources by allocating an insufficient satellite link (resource) to a user or, conversely, assigning an excessive satellite link.

In addition, even if it is desired to divide the satellite link depending on the user contracts or the kinds of networks for providing expandability of the service or a security consideration rather than having all users (client machines) share a single satellite link, the division of the satellite link must be difficult because it is impossible to assign an optimum satellite link beforehand by grasping all factors including a future plan.

Because of the above problems, it has been considered to be difficult for a satellite communication to be used by consumers (end users) as a part of existing network or a part of the Internet.

It is therefore an object of this invention to provide a method and apparatus for dynamically assigning a satellite link to efficiently manage the satellite link.

It is another object of this invention to allow a huge number of end users to optimally utilize a wide bandwidth satellite link using a satellite receiver which consists of an existing machine and a receive-only satellite board and antenna or a set-top-box to make IP connection through a communication satellite, and to allow a service provider to efficiently control a satellite channel for effectively utilizing a satellite resource.

The present invention solves the above-mentioned problems. Even if the satellite link can be provided with bi-directional capability, the satellite communication service can not be deployed to any type of users unless the above objectives are solved. Therefore, this invention provides a method and apparatus which use a satellite link configuration protocol (hereinafter referred to as SLCP) for generally utilizing the satellite link as a part of the Internet and an enterprise network (intranet).

SLCP is a protocol which allows a tremendous number of satellite communication users (client machines) to be efficiently contained and allows a service provider to dynamically allocate satellite channels provided by the service provider to satellite communication receiving means by assigning suitable satellite link IP addresses corresponding to the respective client machines.

Further, because the client machine state is controlled by a managing server, when a client itself requests to terminate with its interruption of the use of a satellite link or the managing server determines that the client does not use the assigned satellite resource, the assigned IP address is released to reuse the resource to another client. This means SLCP allows only the client who needs the satellite link to communicate satellite network resulting in a efficient use of the resource.

This invention provides in one aspect thereof a method of dynamically allocating a satellite link in a communication system comprising a plurality of clients each provided with a satellite communication receiving means and a network communication means as well as a managing server for allocating an IP address to the satellite communication receiving means of a given client in response to a request sent from the given client via the network.

The steps of this method includes storing unique information of the aforesaid plurality of clients, establishing a link between a given client and the managing server via the network in response to a request from the given client. A satellite link is dynamically allocated to the aforesaid given client by the managing server based on the stored unique information of that given client in response to the request. An IP address corresponding to the allocated satellite link is sent from the managing server to the given client via the network.

Another aspect of this invention is an apparatus for dynamically allocating a satellite link to a client in response to a request sent from the client via a network in a communication system comprising a plurality of clients each provided with a satellite communication receiving means and a network communication means. This apparatus can include structure for storing unique information of the plurality of clients along with an arrangement for establishing a link to a given client via the network in response to a request from the given client Also included is structure for dynamically allocating a satellite link to the given client based on the stored unique information of that given client in response to the request and sending an IP address corresponding to the allocated satellite link to the given client via the network.

As such, costs required by a service provider can be largely reduced and much benefit can be returned to users because allocation of a satellite link is realized in the best form and operation is efficiently done by a centralized management server. It is to be noted that such merit would not be accepted by general users if an existed client machine must be extensively modified.

However, because SLCP according to this invention can be implemented as a function of the data link layer of the satellite receive-only interface, it is a prominent point of SLCP that modification of the client is minimized.

The foregoing and other objects, features, applications, and advantages of this invention will be apparent to those having normal skill in the art from the following more particular description of the preferred embodiments thereof as illustrated in the accompanying drawings.

BRIEF DESCRIPTION OF THE DRAWINGS

FIG. 1 is a diagram showing a network layer structure of a client machine.

FIG. 2 is a diagram of a general configuration of a communication system to which this invention may be applied.

FIG. 3 is a flow chart showing the flow of SLCPC from a connection request to a terminate process in the communication system of FIG. 2.

FIG. 4 is a diagram showing an example of a service form of the communication system.

DESCRIPTION OF THE PREFERRED EMBODIMENTS

The SLCP communication method described below is based on a concept of the point to point protocol (PPP) defined in RFC 1661 which is a standard specification of the Internet.

(This RFC or Request for Comments can be seen at the URL of ftp://ftp.isi.edu/in-notes/rfcXXXX.txt where "XXXX" is the number of RFC.) SLCP provides a mechanism to establish a satellite link used by each user dynamically when the user requests to get it and a mechanism to release assigned resources automatically when the user requests to terminate. A general configuration of a communication system to which this invention can be applied is now described with reference to FIG. 2.

In FIG. 2, the communication system 1 comprises servers 12 and 14, client machines (hereinafter simply referred to as client) 16 and 18, and a communication satellite 20. These servers and clients can mutually communicate with each other via a network 10 which can be a wide area network (WAN) or an Internet. Server 12 is a managing server or an SLCP server (SLCPS1) in which a server module of SLCP (SLCPS) is installed. Each of client 16 and 18 is an SLCP client (SLCPC1, SLCPC2) in which a client module of SLCP (SLCPC) is installed. The details of SLCPS and SLCPC will be described later. The server 14 can be a web server responding to a request from the client 16, 18, for example.

The client 16 has a data communication device (DCE) 24 such as a modem or a TA to establish a connection to a public network (PSTN) 22 and has a satellite receiving antenna 26 to receive a wave from the communication satellite 20. The DCE 24 is connected to a network interface 28 of the client 16, while the antenna 26 is connected to a satellite communication interface 30. Similarly, the client 18 has a DCE 32, a receiving antenna 34, a network interface 36 and a satellite communication interface 38. Both of the network interfaces 28 and 36 are bi-directional link interfaces, and thus, these are shown by BDL-IF1 and BDL-IF2, respectively.

On the other hand, the satellite communication interfaces of the clients 30 and 38 are unidirectional link interfaces which can only receive satellite waves from the communication satellite 20, and thus, these are shown by UDL-IF1 and UDL-IF2, respectively. The satellite communication interfaces 30 and 38 may be implemented by a satellite receive-only adapter, or the like, and have a unique satellite board ID which can not be accessed by a user embedded in the form of hardware from the view point of security. This mechanism will be described later.

SLCP server 12 is connected to network 10 via a boundary router 40 to connect different policies networks, while the web server 14 is connected to the network 10 via a router 42. Element 44 is a satellite wave transmitting equipment called a "feed" and transmits an IP packet received from the boundary router 40 to the communication satellite 20 via a satellite signal multiplexor (MUX) 46. Then the IP packet is finally delivered to the UDL-IF of the requesting client.

SLCP server 12, the boundary router 40, the feed 44, the MUX 46 and the transmitting antenna 48 comprise a "Service Provider". The connection among them may be in the form of a LAN. While not shown in FIG. 2, the communication system 1 is provided with a user database storing the unique information of the clients 16 and 18. The user database is implemented in the SLCP server 12 or a authentication server related thereto.

The operation of the communication system 1 shown in FIG. 2 is now described in detail with reference to the flow chart of FIG. 3. The "Authentication Server" shown in FIG. 3 is a server executing an authentication procedure to be described below and may be the same as the SLCP server 12 or another server separate to this server though it is not shown in FIG. 2.

Because it is necessary to initially set the clients 16 and 18 before the flow of FIG. 3 is started, the initial setting is first described. Each SLCP client has "User Information (user ID, password, etc.)" which is informed to the user beforehand and the "SLCP Server" is described and stored in an SLCPC definition file in its own memory device, such as a disk device (not shown).

In the case of an SLCP client having a plurality of BDL-IFs (terrestrial line interfaces), one BDL-IF for communicating with the SLCP server (SLCPS1) 12 is chosen in advance by the client. A list of destinations which always uses BDL-IF for sending/receiving has been also defined so as to be ready for a communication with a specific destination party without going through a satellite link regardless of the use of SLCP if the client wants. This can be implemented by a route control table. However, a route to the SLCP server 12 is automatically set so as to always use a BDL-IF.

Each client then dials up to an independent site to allocate an IP address to each BDL-IF. A bi-directional link, BDL, using a terrestrial link will have been established at that time. This state surely shows to establish an IP reachability to an SLCP server (SLCPS1) 12 which has started SLCPS, a server module of SLCP.

After the above described environment has been prepared, each client (SLCPC1, SLCPC2) requesting a service starts an SLCPC module, issues an SLCPC connection request in the first step 100, and, in the next step 101, determines whether a BDL is established or not. If the BDL has been established in the above initial setting, the following procedure, step 102, is executed to start an SLCP connection. If it has not been established, step 110 is executed to terminate the SLCPC service.

When the SLCP connection is started, a state transition is effected according to a phase diagram written in RFC1661 using PPP over TCP. Specifically, as a series of states in a normal case, a link is established between SLCPC and SLCPS by a link establishing phase (steps 103 and 200), SLCPC is then authenticated by an authentication phase (steps 104, 201, 202 and 203) and finally IP address information is delivered to SLCPC by a network layer protocol phase conforming to IPCP of RFC1332. The dynamic allocation of the satellite link according to this invention is effected between the authentication phase and the network layer protocol phase.

When a link dead is detected in the link establishing phase, step 103, of SLCPC, the flow proceeds to the terminate phase, step 110, because it is unable to establish the BDL link. When it is unable to establish a link in step 200 of SLCPS, the flow proceeds to an SLCPC terminate process, step 208. A client authentication start request of SLCPC, step 104, sends authentication data which is unique information of each client to SLCPS. An ID representing contract information between a user and a service provider (contract service ID) may be used as the authentication data by concatenating with the user information and the satellite board ID mentioned in the above.

SLCPS receiving authentication data from the client enters an authentication phase using authentication data stored in the user database of an SLCP server or a separate authentication server which may be operated with the SLCP sever. If the authentication is failed, the flow goes from step 202 to step 208. The communication in the authentication phase is carried out in conformance to CHAP of RFC1994 and the authentication itself obeys RADIUS method of RFC2138. In addition, a function of accounting may be implemented in conformance to RFC2139 if needed.

When the client authentication has been successfully completed (step 203), SLCPC issues a UDL establishing request in step 105 in order to get an IP address for its UDL-IF. SLCPS starts making a response to assign the IP address in step 204, and in a next step 205, it tries to determine whether the IP address can be given. To make this procedure smoothly, an SLCP server maintains a plurality of address pools each listing a predetermined number of IP addresses (see FIG. 4), and an assigned IP address list (not shown) in which assigned IP addresses are recorded. These address pools and list provide information to the server to determine whether there may be any available IP address based on the client authentication data.

If an appropriate IP address is not available, the flow proceeds to an SLCPC terminate process, step 208. If an IP address can be assigned, SLCPS selects an IP address for the requesting client from the address pool associated with the client and records it in the assigned IP address list. SLCPS then notifies the client of the assigned IP address (UDL-IP1/UDL-IP2), a service ID (SID) and a new default gateway address (UDL-IP3), and finally finishes IP address assignment (step 206). This communication method is based on IPCP described in RFC1332 as described in the above.

The SID notified to the client is for identifying a satellite link, and a user can not use a wrong satellite link either inadvertently or intentionally because the SID is assigned as a result of a completion of the authentication by using the client information and its satellite board ID which can not be altered by hand. This is an advantage as a security consideration.

Further, this mechanism also brings another benefit to assign independent satellite links based on several kinds of services and/or clients networks rather than assigning an IP address from a single address pool. This implies that a service provider can distinguish each service by selectively using this address pool mechanism. As such, the service provider can differentiate service items depending on users and divide the bandwidth of the satellite link flexibly and dynamically depending on customers and the environment.

As described in the above, the information which the SLCP client receives from the SLCP server includes not only the IP address (UDL-IP1 or UDL-IP2) of its own satellite receive-only interface (UDL-IF1 or UDL-IF2) but also a UDL IP address (UDL-IP3) of the feed 44 (or a feed router not shown if the feed 44 is not a router) which is a new default gateway. Because the SLCP communication which exchanges such various kinds of data goes through LAN/WAN/Internet, it is recommended to use encrypted streams from a security consideration.

When all phases have been successfully completed by the above process, an IP address for a satellite link (service ID) which is available to the client's UDL-IF has been dynamically assigned, the routing table of the client is modified in step 106, and the default interface is changed to its UDL-IF. However, the route to the SLCP server 12 (SLCPS1) must be automatically set so as to consistently use BDL-IF. Similarly, a host route or a network route is set so that a terrestrial line is purposely used for sending to and receiving from a destination which is statically set to use the BDL-IF in the initial setting of the client.

When the UDL is established by the above described process (step 107), the TCP/IP stack sends an IP packet toward the UDL-IF except the one addressed to BDL-IF which is set to be sent from the BDL-IF at the initial setting. A request packet is then sent to the UDL-IF for a target server such as the web server 14, but, at this time, the output IP packet is hooked in the data link layer of a preselected BDL-IF at the moment when the IP packet is delivered from the IP layer to the data link layer of the UDL-IF. Then this IP packet is sent out from the BDL-IF through DCE (24, for example). As such, an IP packet whose destination address is the UDL-IP is sent to the web server 14 via the terrestrial link.

The web server 14 receives this IP packet and finds that the source IP address is UDL-IP1 or UDL-IP2. From the routing table of its own or a parent router, the server 14 can recognize that the route to the source is a portion of the address range controlled by the service provider. After that, the server 14 transfers a reply packet toward a boundary router 40 controlled by the service provider. The boundary router 40 sends the reply packet either to a router (not shown) to which the feed 44 is connected or directly to the feed 44 if the feed 44 is a router. The feed 44 (or a feed router) transmits this to a transponder (communication satellite 20) via a satellite signal multiplexor (MUX) to have this eventually delivered to the UDL-IF of the requesting client.

Meanwhile, the SLCP server can monitor the state of each SCLP client using the PPP function. This is done by periodically exchanging keep alive (KA) packets via the terrestrial line which query the state of each client (steps 108 and 207). The SLCP server recognizes that the client has not normally ended or has unexpectedly halted if the server cannot receive its KA reply within a predetermined time interval.

Then SLCPS performs a terminate process of SLCPC (step 208) and tries to have the resource (satellite link, IP address) which was assigned to the client returned. This is done by deleting the corresponding resource information from the assigned resource table described above. If the client state is not abnormal and the satellite communication has been terminated successfully, this terminate process is performed by sending an SLCPC terminate request to SLCPS in step 109 of SLCPC. Due to these procedures, the assigned IP addresses and satellite links can be reused.

Finally, an example of a service form using SLCP is now described with reference to FIG. 4. FIG. 4 shows satellite links which comprise a first network NW1 used as a shared Internet segment which serves to general consumers, a second network NW2 used as a part of a network owned by a specific ISP, and a third network NW3 used as a part of an enterprise LAN (intranet), respectively. An IP address of the terrestrial link interface for each client (BDL-IF) must be a unique address assigned by a dial up server before an SLCP connection is initiated as described in the above.

In FIG. 4, NW1~3 are bundled by a thick ring 50. This thick ring shows a satellite (one transponder) itself. This transponder may be divided into an arbitrary number of carriers (carrier waves) based on each security requirement as shown by thin rings 52 and 54. By using SLCP, a client which must be associated with NW1 is automatically assigned a link of NW1 and an IP address fitting the link by an authentication procedure of the SLCP server 56.

This is also true for NW2. To this end, the SLCP server 56 maintains two address pools as illustrated to assign an IP address to each client of NW1 and NW2. An IP address of a client which should connect to NW3 is assigned by another SLCP server 58 which maintains an address pool for NW3. Elements 60, 62 and 66 are routers for the respective networks. While the Internet router 60 and the intranet router 62 are connected to a common feed 64 in the example of FIG. 4, they may be connected to separate feeds, respectively.

Because SLCPS can assign a suitable satellite link according to client information delivered by SLCPC as described above, a satellite network can be used for lots of flexibility, which may be one segment or backbone of an Internet or a part of an enterprise network (intranet). Additionally, the above configuration may be implemented with a single SLCP server. It is desirable to use separate SLCP servers as shown in FIG. 4 from the point of operation and security considerations. Also, feed configuration may be separated depending on the policy of a service provider.

While the present invention has been described with particularity relative to the foregoing preferred embodiments, various changes, modifications, and applications will be readily apparent to those having normal skill in the art without departing from the scope and spirit of this invention.

What is claimed is:

1. In a communication system having (1) a satellite, (2) a service provider having a managing server, (3) a plurality of clients, each client having a bidirectional network interface and a receive-only satellite interface for receiving signals from the satellite, and (4) a network connected intermediate the service provider and the bi-directional network interface of each client, a method for dynamically assigning a satellite link to a given client wherein the managing server assigns an IP address to the receive-only satellite interface of the given client in response to a request that is transmitted from the given client to the service provider via the given client's bi-directional network interface and the network, the method comprising the steps of;

storing unique identification information for each of the plurality of clients at the service provider;

providing a unique pool of IP addresses for each of the plurality of clients at the service provider, each pool of IP addresses listing a number of IP addresses associated with a corresponding client;

providing an assigned IP address list, the assigned IP address list containing IP addresses that have been assigned to clients;

utilizing the bi-directional interface of the given client to establish a bi-directional network communication link between the given client and the managing server in response to a request from the given client;

in response to the request from the given client, utilizing the managing server to dynamically assign a unique satellite link to the given client based on the stored unique identification information of the given client;

in response to the request from the given client, assigning from the pool of IP addresses associated with the given client an IP address that is unique to the assigned satellite link;

listing the assigned IP address in the assigned IP address list;

utilizing the bi-directional network communication link to transmit the assigned IP address from the managing server to the given client;

utilizing the assigned IP address at the given client as a source address within the given client's receive-only satellite interface; and utilizing the bi-directional network communication link at the given client to transmit an IP packet from the given client to a destination server, the IP packet including the source address.

2. The method of claim 1 wherein the network is the Internet and wherein the destination server is a server that is connected to the Internet.

3. The method of claim 1 wherein the network is selected from the group Internet, intranet and wide area network.

4. The method of claim 1 wherein the network comprises both an Internet network and an intranet network, and wherein the service provider includes a managing server for each of the Internet network and the intranet network.

5. The method of claim 1 wherein the network includes a plurality of different networks respectively corresponding to a plurality of different satellite links, wherein a unique IP address pool is provided at the service provider for each network, and wherein the step of dynamically assigning a unique satellite link to a given client assigns a satellite link that corresponds to a network to which the bi-directional network interface of the given client is connected.

6. The method of claim 1 including the steps of:
setting the receive-only satellite interface of the given client as a default interface for receiving IP packets from the satellite, except for IP packets that are intended for a specific destination;
receiving the IP packets at the receive-only satellite interface of the given client; and
transmitting the IP packets from the bi-directional network interface of the given client to the network.

7. The method of claim 1 wherein the managing server is a SLCP server and wherein the plurality of clients are SLCP clients.

8. A satellite communication system for dynamically assigning a satellite link to a given client, comprising:
a service provider having a managing server;
a plurality of clients, each client having a bidirectional network interface, and each client having a receive-only satellite interface for receiving signals from a satellite;
a network connected intermediate the service provider and the bi-directional network interface of each of the plurality of clients;
a store of unique information for each of the plurality of clients at the service provider;
a pool of IP addresses for each of the plurality of clients at the service provider, each pool of IP addresses listing a number of IP addresses associated with a corresponding client;
an assigned IP address list listing IP addresses that have been assigned to clients;
means whereby the bi-directional interface of a given client may be used to establish a bi-directional network communication link between the given client and the managing server in response to a request from the given client;
means whereby, in response to the request from the given client, the managing server dynamically assigns a unique satellite link to the given client based on the stored unique information of the given client;
means whereby, in response to the request from the given client, an IP address is assigned from the pool of IP addresses associated with the given client to the assigned satellite link;
means whereby the assigned IP address is listed in the assigned IP address list;
means whereby the bi-directional network communication link is utilized to transmit the assigned IP address from the managing server to the given client;
means whereby the assigned IP address is utilized at the given client as a source address for the given client's receive-only satellite interface; and
means whereby the bi-directional network communication link at the given client is utilized to transmit an IP packet from the given client to a destination server, the IP packet including the source address.

9. The system of claim 8 wherein the network is the Internet and wherein the destination server is a server that is connected to the Internet.

10. The system of claim 8 wherein the network is selected from the group Internet, intranet and wide area network.

11. The system of claim 8 wherein the network comprises both an Internet network and an intranet network, and wherein the service provider includes a different managing server for each of the Internet network and the intranet network.

12. The system of claim 8 wherein the network includes a plurality of different networks respectively corresponding to a plurality of different satellite links, wherein a unique IP address pool is provided at the service provider for each network, and wherein the dynamically assignment of a unique satellite link to a given client assigns a satellite link that corresponds to a network to which the bi-directional network interface of the given client is connected.

13. The system of claim 8 wherein the receive-only satellite interface of the given client is a default interface for receiving IP packets from the satellite, except for IP packets that are intended for a specific destination, and wherein IP packets received at the receive-only satellite interface of the given client are transmitted from the bi-directional network interface of the given client to the network.

14. The system of claim 8 wherein the managing server is a SLCP server and wherein the plurality of clients are SLCP clients.

15. A method for dynamically assigning a satellite link in a communication system having a plurality of clients each provided with a unidirectional satellite receiving means and a bi-directional network communication means, and a managing server for assigning an IP address to the satellite receiving means of a given client in response to a request transmitted from the given client to the managing server via the network communication means of the given client, the method comprising the steps of;
providing a plurality of address pools at said managing server, each address pool containing a plurality of IP addresses that may be assigned to the satellite receiving means of a corresponding one of the plurality of clients;
providing an assigned address lists at said managing server listing IP addresses that have already been assigned to the satellite receiving means of the plurality of clients;
storing unique information of each of said plurality of clients at said managing server,
establishing a link between a given client and said managing server via the network communication means of said given client in response to a request from said given client,
in response to said request from said given client, utilizing said managing server to dynamically assigning a satellite link to said given client based upon the stored unique information of said given client,
determining an IP address for said assigned satellite link by making reference to the address pool corresponding to said given client, and by making reference to the assigned address list; and
transmitting said determined IP address for said assigned satellite link from said managing server to said given client via the network communication link.

16. A method as set forth in claim 15 including the steps of:
providing that said given client uses said determined IP address as a source address for the satellite receiving means of said given client; and
providing that said given client transmits an IP packet including said source address to a destination server via the network communication means of said given client.

17. Apparatus for dynamically assigning a satellite link to a given client in response to a request that is transmitted from the given client via a bi-directional network, said apparatus comprising;
    a plurality of clients, each client including a unidirectional satellite receiving means, and each client including a bi-directional network communication means that is connected to the bi-directional network;
    a plurality of IP address pools, each IP address pool corresponding to the satellite receiving means of a different one of the plurality of clients;
    an assigned address list listing IP addresses assigned to the satellite receiving means of the plurality of clients,
    means for storing unique information of each of the plurality of clients,
    means for establishing a link to the given client via the bi-directional network in response to a request from the given client;
    means for dynamically assigning a satellite link to the given client based upon the stored unique information of the given client; and
    means for transmitting an IP address corresponding to the assigned satellite link to the given client via the bi-directional network, the transmitted IP address being selected from IP addresses within an address pool associated with the given client, and the transmitted IP address being assigned to the satellite link by referring to the assigned address list.

18. Apparatus as set forth in claim 17 in which the given client uses the transmitted IP address as a source address for its satellite receiving means and transmits an IP packet including the source address to a destination server via the bi-directional network.

19. Apparatus as set forth in claim 18 wherein the given client includes:
    means for setting the satellite receiving means of the given client as a default interface for receiving IP packets except for IP packets that are intended for a specific destination, and
    means for transmitting default IP packets from the bi-directional network communication means of the given client to the bi-directional network.

20. Apparatus as set forth claim 19 wherein the bi-directional network includes a plurality of differing bi-directional networks respectively corresponding to differing satellite links, and wherein the means for dynamically assigning a satellite link assigns a satellite link corresponding to a bi-directional network to which the given client is connected.

21. Apparatus as set forth in claim 20 wherein the plurality of networks include an Internet and an intranet, and wherein a managing server is provided for each of the Internet and the intranet.

22. Apparatus as set forth in claim 18 wherein the bi-directional network includes a plurality of differing bi-directional networks respectively corresponding to differing satellite links, and wherein a satellite link is assigned corresponding to a bi-directional network to which the given client is connected.

23. Apparatus as set forth in claim 22 wherein the plurality of bi-directional networks include an Internet and an intranet, and wherein a separate managing server is provided for each of the Internet and the intranet.

24. Apparatus as set forth in claim 17 wherein the bi-directional network includes a plurality of differing bi-directional networks respectively corresponding to differing satellite links, and wherein a satellite link is assigned corresponding to a bi-directional network to which the given client is connected.

25. Apparatus as set forth in claim 24 wherein the plurality of networks include an Internet and an intranet, and wherein a managing server is provided for each of the Internet and the intranet.

* * * * *

UNITED STATES PATENT AND TRADEMARK OFFICE
CERTIFICATE OF CORRECTION

PATENT NO.    : 6,741,573 B1
DATED         : May 25, 2004
INVENTOR(S)   : Asaeda et al.

It is certified that error appears in the above-identified patent and that said Letters Patent is hereby corrected as shown below:

<u>Title page,</u>
Item [73], Assignee, after "International Business Machines Corporation, Armonk, NY (US)", insert -- ; JSAT Corporation, Tokyo (JP); NSI Co., Ltd., Tokyo (JP) --.

Signed and Sealed this

Twenty-seventh Day of July, 2004

JON W. DUDAS
*Acting Director of the United States Patent and Trademark Office*